(12) United States Patent
Wadsworth et al.

(10) Patent No.: US 7,244,463 B2
(45) Date of Patent: Jul. 17, 2007

(54) *GARCINIA MANGOSTANA L.* ENHANCED ANIMAL FOOD PRODUCT

(75) Inventors: John W. Wadsworth, Orem, UT (US); Stephen P. Story, Alpine, UT (US); Bing-Nan Zhou, Pleasant Grove, UT (US); Robert V. Ogden, Cedar Hills, UT (US); Richard G. Godbee, Minden, NV (US); Afa K. Palu, Orem, UT (US); C. Jarakae Jensen, Cedar Hills, UT (US)

(73) Assignee: Tahitian Noni International, Inc., Provo, UT (US)

( * ) Notice: Subject to any disclaimer, the term of this patent is extended or adjusted under 35 U.S.C. 154(b) by 0 days.

(21) Appl. No.: 11/253,130

(22) Filed: Oct. 18, 2005

(65) Prior Publication Data

US 2007/0087108 A1     Apr. 19, 2007

(51) Int. Cl.
*A23K 1/00* (2006.01)
*A61K 36/00* (2006.01)

(52) U.S. Cl. .......................... 426/635; 426/2; 426/53; 426/805; 426/807; 424/777

(58) Field of Classification Search .................. 426/2, 426/53, 635, 805, 807; 424/777
See application file for complete search history.

(56) References Cited

U.S. PATENT DOCUMENTS

| | | | |
|---|---|---|---|
| 4,039,559 A | 8/1977 | Nakamura | 260/345.5 |
| 4,409,144 A | 10/1983 | Heinicke | 260/236.5 |
| 4,463,025 A | 7/1984 | Strobel | 426/599 |
| 4,543,212 A | 9/1985 | Heinicke | 546/1 |
| 4,666,606 A | 5/1987 | Heinicke et al. | 210/632 |
| 4,793,991 A | 12/1988 | Slimak | 424/64 |
| 4,948,785 A | 8/1990 | Nguyen | 514/54 |
| 4,996,051 A | 2/1991 | Meer et al. | 424/195.1 |
| 5,106,634 A | 4/1992 | Thacker et al. | 426/31 |
| 5,110,803 A | 5/1992 | Nguyen | 514/54 |
| 5,213,836 A | 5/1993 | McGillivray et al. | 426/615 |
| 5,268,467 A | 12/1993 | Verbiscar | 536/123 |
| 5,275,834 A | 1/1994 | Thibault et al. | 426/577 |
| 5,288,491 A | 2/1994 | Moniz | 424/195.1 |
| 5,431,927 A | 7/1995 | Hand et al. | 426/2 |
| 5,725,875 A | 3/1998 | Noll et al. | 424/445 |
| 5,736,174 A | 4/1998 | Cooper et al. | 426/531 |
| 5,744,187 A | 4/1998 | Gaynor | 426/599 |
| 5,770,217 A | 6/1998 | Kutilek, III et al. | 424/442 |
| 5,776,441 A | 7/1998 | Scancarella et al. | 424/61 |
| 5,843,499 A | 12/1998 | Moreau et al. | 462/2 |
| 5,851,573 A | 12/1998 | Lepine et al. | 426/74 |
| 5,922,766 A | 7/1999 | Acosta et al. | 514/561 |
| 5,961,998 A | 10/1999 | Arnaud et al. | 424/401 |
| 5,962,043 A | 10/1999 | Jones et al. | 426/2 |
| 5,976,549 A | 11/1999 | Lewandowski | 424/195.1 |
| 6,029,141 A | 2/2000 | Bezos et al. | 705/27 |
| 6,039,952 A | 3/2000 | Sunvold et al. | 424/195.1 |
| 6,086,859 A | 7/2000 | Calello et al. | 424/64 |
| 6,086,910 A | 7/2000 | Howard et al. | 424/442 |
| 6,133,323 A | 10/2000 | Hayek | 514/725 |
| 6,136,301 A | 10/2000 | Pelle et al. | 424/63 |
| 6,139,897 A | 10/2000 | Goto et al. | 426/601 |
| 6,156,355 A * | 12/2000 | Shields et al. | 426/74 |
| 6,214,351 B1 | 4/2001 | Wadsworth et al. | 424/195.1 |
| 6,254,913 B1 | 7/2001 | Wadsworth et al. | 426/481 |
| 6,261,566 B1 | 7/2001 | Pillai et al. | 424/195.1 |
| 6,280,751 B1 | 8/2001 | Fletcher et al. | 424/401 |
| 6,291,533 B1 | 9/2001 | Fleischner | 514/682 |
| 6,299,925 B1 | 10/2001 | Xiong et al. | 426/597 |
| 6,387,370 B1 | 5/2002 | Yegorva | 424/94.2 |
| 6,405,948 B1 | 6/2002 | Hahn et al. | 241/1 |
| 6,436,449 B2 | 8/2002 | Gidlund | 424/752 |
| 6,477,509 B1 | 11/2002 | Hammons et al. | 705/27 |
| 6,589,514 B2 | 7/2003 | Jensen et al. | 424/59 |
| 6,730,333 B1 * | 5/2004 | Garrity et al. | 424/777 |
| 6,737,089 B2 * | 5/2004 | Wadsworth et al. | 424/777 |
| 6,749,875 B2 | 6/2004 | Selleck | 426/270 |
| 2001/0033871 A1 | 10/2001 | Gidlund | 424/725 |
| 2002/0068102 A1 | 6/2002 | Su et al. | 424/765 |
| 2003/0060405 A1 | 3/2003 | Klieiman et al. | |
| 2003/0108629 A1 | 6/2003 | Chou | 424/765 |
| 2003/0206895 A1 | 11/2003 | Cavazza | 424/94.1 |
| 2004/0258780 A1 | 12/2004 | Woltering et al. | |

FOREIGN PATENT DOCUMENTS

WO     88/05304 A1     7/1988

(Continued)

OTHER PUBLICATIONS

"Great Life Rubicon for Dogs", downloaded from http://www.healthyplanetrx.com, 6 pages, 2003.*
"Xango" testimonials, downloaded from http://www.lovemangosteen.net/files/5animals.pdf, 9 pages, 2003.*
"Great Life Performance Pet Products", product listing, 2002, 3 pages.*
Bates, et al., "Principles and Practices of Small-and Medium Scale Fruit Juice Processing," FAO Agricultural Serv. Bull. 146 (2001).
Bennett, "Xanthones from Guttiferae," Phytochemistry 28(4):967-998 (1989).
Botanical Benefits Irish Moss Hand & Body Lotion (htt9://www.a-better-way.com/catalog/personal.html) (2001).

(Continued)

*Primary Examiner*—C. Sayala
(74) *Attorney, Agent, or Firm*—Kirton & McConkie; Michael F. Krieger

(57) ABSTRACT

The present invention advances prior art animal food products by providing an animal food product formulated with *Garicinia mangostana L.*, or Mangosteen fruit, from the Mangosteen plant. The addition of Mangosteen to the animal food product of the present invention serves to provide significant health advantages not found in prior art animal food products.

51 Claims, No Drawings

FOREIGN PATENT DOCUMENTS

| WO | 01/15551 A1 | 3/2001 |
|---|---|---|
| WO | 01/15553 A1 | 3/2001 |
| WO | 01/64231 A | 9/2001 |
| WO | 02/45654 A | 6/2002 |
| WO | 02/45734 A | 6/2002 |

OTHER PUBLICATIONS

Brock, et al., "Biology of Microorganisms," 6th Ed., Prentice-Hall, Inc., p. 334 (1994).
Buckenhuskes et al., "Analytische-Charakterisierung von pasteurtem Sauerkraut in Dosen," Ind. OBST—Und Gemuseverwertung, V. 73(12):454-463 (1988) XP-001106074.
Conquer et al., "Supplementation with Quercetin Markedly Increases Plasma Quercetin Concentration Without Effect on Selected Risk Factors for Heart Disease in Healthy Subject," J. Nutrition Bethesda (1998).
Csiszar et al., "Extracts of Morinda Citrifolia (Noni) Exhibit Selective Anti-tumor Activity Against Breast and Colon Carcinoma Cell Lines," Proc. Am. Assoc. Cancer Res. Ann. Mtg. 42:634: (2001).
Cushman et al., "Angiotensin Converngin Enzyme Inhibitors: Evolution of a New Class of Antihypertensive Drugs," p. 1-25 (1981).
Daulataba, et al., "Ricinoleic acid in *Morinda citrifolia* seed oil," J. Oil Tech. Assoc. India (Mumbai, India) 21(2):26-27 (1989).
Dittmar, *Morinda* "Use in Indigenous Samoan Medicine," J. of Herbs, Spices & Medicinal Plants, 1(3):77-92 (1993).
El-Gammal et al., "Antimicrobial Activities of Some Flavonoid Compounds," Microbiol. 141:561-565 (1986).
Elkins, Hawaiian Noni, Woodland Publishing, pp. 6-31 (1998).
Gagnon, D., "Liquid Herbal Drops in Everyday Use," 3d Ed., Bot. Res. Ed. Inst., p. 27 (1997).
Gura, "Systems for Identifying New Drugs are Often Faulty," Science 278:1041-1042 (1997).
Hasegawa, et al., "Anti-Helicobacter Pylor; Medicine Containing Extract of Dried Root of *Morinda citrifolia*," Abstract (1996).
Hirazumi et al., "An Immunomodulatory Polysaccharide-Rich Substance from the Fruit Juice of *Morinda citrifolia* (Noni) with Antitumor Activity," Phytotherapy Research, 13:380-387 (1999).
Holleran, "The Zotics Splash, Beverage Industry," 91(6) (2000).
Lampur, "Morinda achieves phenomenal sales of Tahitian noni juice" Malaysian Nat. News Agency Jul. 1999, p. 1.
Kimstra et al., "Foods of the Key deer," FL Sci., 53(4):264 273 (1990).
Levand et al., "Some chemical constituents of *Morinda citrifolia*," Planta Medica 36(2):186-187 (1979).
Liu et al., Two Novel Glycosides from the Fruits of *Morinda citrifolia* (Noni) Inhibit AP-1 Transactivation and Cell Transformation in the Mouse Epidermal JB6 Cell Line, Cancer Res. 61:5749-5756 (2001).
Marona et al., "Pharmacological properties of some aminoalkanolic derivatives of xanthone," Pharmazie 56:567-572 (2001).
Morton, "The ocean-going noni, or Indian mulberry (*Morinda citrifolia*) and some of its 'colorful' relatives," Econ. Bot., 46(3):241-256 (192).
Mumford, L., "Benefits of Noni Juice may be Imagined; $30 Price Tag Isn't," So. Bend Tribune, So. Bend, Ind., pp. 1-2 (1998).
Naito, "Trace components in mulberry leaves," Nippon Nogei Kagaku Kaishi 42(7):423-425 (1968).
Peres et al., "Tetraoxygenated naturally occurring xanthones," Phytochemestry 55:683-710 (2000).
Product Alert. Oct. 11, 1999 29(19) PROMT Abstract.
Product Alert. Dec. 27, 1999 (29(24) PROMT Abstract.
Product Alert. Jun. 12, 2000 30(11) PROMT Abstract.
Rosenfelt, "Tropical Noni, a Tonic Boom; Nasty-Tasting Fruit Rockets onto the Health Product Market," Wash. Post; Aug. 7, 1997, p. C01:1-4 of Proquest.
Sang, et al., "Chemical Components in Noni Fruits and Leaves (*Morinda citrifolia* L.); Quality Management of Nutraceuticals," Proceedings of a Symposium, ACS, Wash., DC pp. 134-150 (2002).
"Rachel Perry Environmental Skin Protector SPF 18," Product Alert, V.29(2) (1999).
Tahitian Noni Products (http://www.noni-now.com) (1998-2003).
Termumo Corp., "Anti-helicobacter pylon agent config. Extract of dried roots of *Morinda citrifolia*—is used to treat recurring infection diseases of upper respiratory tract caused by Helicobacter pylori e.g. peptic ulcers," Database DWPI on West, An. 1996-439483 JP 08-217686—Japan (Aug. 1996).
Wang et al., J. Agric. Food Chem. 47(12):4880-4882 (1999).
Webb, "Noni Juice Advice," Prevention Magazine 52:66 (2000).
Website publication: "A Pure Hawaiian Noni Juice," web.archive.org/web/20030523122956/http://www.nonialoha.com (2003).
Website publication: "Betterman" by Interceuticals, wwww.naturalhealthconsultant.com/Monographs/Betterman.html (1998).
Website publication: "Morinda," www.drugdigest.org/DD/DV/HerbsTake/0,3927,552025/Morinda.00.html (2003).
Website publication: "NONI in the News," www. incc.org/news-june.htm (2002).
Website publication: "NONI," www.web.archive.org/web/20020207214423/http://wwwlnukahivatrading.com/noni.htm (2002).
Website publication: "Noni Juice," www.tipsofallsorts.com/noni.html p. 1-11 (1999).
Website publication "Noni or Nonu Fruit," www.noni-nonu.com (1999).
Website publication, "100% Pure Standardized Noni Juice," www.evitamins.com (1999).
Weil, A., "Alternatives," Northern Echo, Darlington, UK, p. 1-2 (2000).
Yamada et al., "Antibacterial Composition" Abstract (1984).
Younos et al., "Analgesic and Behavioral Effects of *Morinda-citrifolia*" Planta Medica 56(5):430-434 (1990).
Angiotensin 1-Converting Enzyme Ace; http;//ncbi.nim.nih.gov/enterz/query.fegi?cmd=Retrieve&db=OMIM&dopt-Detailed; pp. 1-21 downloaded on Mar. 3, 2004.
Bankole, S.A., Effect of essential oils from two Nigerian medicinal plants (*Azadirachta indica* and *Morinda lucida*) on growth and aflatoxin B1 production in maize grain by a toxigenic *Aspergillus flavus*) Letters in Applied Bbiol. 24(3): 190-192 (1997).

* cited by examiner

GARCINIA MANGOSTANA L. ENHANCED ANIMAL FOOD PRODUCT

BACKGROUND

1. Field of the Invention

The field of the invention relates to animal food products, and more particularly to animal food products for domestic, exotic and companion animals. Specifically, the present invention relates to an improved animal food product and composition enhanced with *Garcinia mangostana L.* ("Mangosteen") or Mangosteen dietary fiber.

2. Background

Animal Food Products

Animal food products designed for domestic animals, livestock, or pets, and particularly companion animals, such as dogs and cats, are generally and preferably prepared as full-feeding foods, which means that the particular composition contains all the necessary nutrients and supplements needed to maintain the health and vigor of the pet. The food composition is balanced in nutrition so that a diet limited to that particular feed will fulfill all of the pet's nutritional needs. Such food products are achievable in two ways. First, industry guidelines, as set and monitored by the Association of American Feed Control Officials (AAFCO), are provided in order to ensure a proper balance of nutrients; and second, each animal food product is actually tested in its specific formulations in appropriate feeding studies.

The typical ingredients contained within a pet food formulation are protein, carbohydrates, fat, vitamins and minerals. Each of these is present in varying percentages by weight of the specific formulation or composition, sufficient to meet the complete nutritional requirements of the pet. In addition, other ingredients may be added depending upon the specific needs of the animal for which the food is intended.

A wide variety of different animal food formulations are commercially available. Most include either wet or dry type products. The definition of wet or dry is derived from the percentage of water existing in the formulation by weight. Typically, such animal food formulations are designed to be consumed by any breed. In the past, the nutrients or ingredients in these formulations are not typically designed to provide specific advantages to a pet if desired or needed. Recently however, animal food formulations have been designed with a specific goal in mind. Many animal food formulations available on the market today are specialized in that they may cater to animals of different ages, different breeds, or those with certain needs, such as obesity, bone loss, etc. Other formulations address different energy requirements among animals. An additional segment of the animal food market incorporates differences in ingredient usage or product form, which tend to lend themselves to more attractive tastes or varieties.

*Garcinia mangostana L.*

*Garcinia mangostana L.* ("Mangosteen") is an evergreen tree about ten to twenty-five meters tall. Mangosteen fruit is often called "Queen of Fruits" due to its pleasant flavor. The mangosteen fruit is round with slightly flattened ends and is about 6 to 7 cm in diameter. It has a smooth thick, firm rind that is pale green when immature and dark purple or red-purple when ripe. Enclosed by the rind is the edible pulp in four to eight white segments. Some fruits have no seeds (seedless) while others have 1-5 fully developed seeds.

SUMMARY AND OBJECTS OF THE INVENTION

The present invention is directed to a method of implementing *Garicinia mangostana L.*, ("Mangosteen") into various compositions and formulas of animal food products. In one currently preferred embodiment, a quantity of *Garicinia mangostana L.* fruit juice and pulp is obtained, using the process as described below. Subsequently, the resulting fruit juice and dietary fiber is added to an animal food product for providing significant health advantages over prior art animal food products.

The Mangosteen fruit juice is obtained from the puree of the Mangosteen fruit and is further processed into fruit juice, wherein it may be added or mixed with other ingredients.

To produce the dietary fiber, the wet pulp is filtered from the juice, wherein the wet pulp has a fiber content of from about 10 to 40 percent, by weight. The wet pulp is preferably pasteurized at a temperature of at least 181° F. (83° C.). The wet pulp can be dried or used wet. Drying is preferably accomplished using conventional drying techniques, such as freeze drying, drum drying, tray drying, sun drying, and spray drying. The dried *Garicinia mangostana L.* pulp preferably has a moisture content in the range from 0.1 to 15 percent by weight and a fiber content in the range from 0.1 to 99 percent by weight.

The *Garicinia mangostana L.* pulp can be further processed into a high fiber dietary product containing additional ingredients, such as a supplemental dietary fiber, a sweetener, a flavoring agent, coloring agent, and/or a nutritional ingredient.

In another embodiment, a quantity of *Garicinia mangostana L.* juice and pulp is obtained and pasteurized or enzymatically treated. The juice and pulp mixture is then dried to a moisture content less than about 20%, by weight. The dried juice and pulp contains protein from the *Garicinia mangostana L.* plant at a concentration typically from 0.1 to 15 percent by weight, and fiber at a concentration from 0.1 to 90 percent by weight. Additional ingredients are preferably mixed to the dried juice and pulp, such as a supplemental nutritional ingredient with the juice and pulp.

Therefore, it is an object of the preferred embodiments of the present invention to provide an animal food product comprising *Garicinia mangostana L.*, or Mangosteen.

It is another object of the preferred embodiments of the present invention to provide an animal food product having significant health benefits.

To achieve the foregoing objects, and in accordance with the invention as embodied and broadly described herein, the present invention features an animal food product comprising protein, fats, vitamins, minerals, water, and carbohydrates, wherein the carbohydrates comprise *Garicinia mangostana L.* present in an amount by weight from about 1 to 50 percent of the total dietary fiber contained within the animal food product.

The present invention also features a process for feeding an animal comprising the step of feeding the animal a diet of an animal food product containing an effective amount of *Garicinia mangostana L.* dietary fiber comprising 1 to 50 percent by weight of the total dietary fiber composition contained therein.

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present is not intended to limit the scope of the invention, as claimed, but is merely representative of the presently preferred embodiments of the invention. The following disclosure of the present invention is grouped into three subheadings, namely "General Discussion of *Garicinia mangostana L.*," "General Discussion of Animal Food Products" and "*Garicinia mangostana L.* Enhanced Animal Food Product." The utilization of the subheadings is for convenience of the reader only and is not to be construed as limiting in any sense.

I. General Discussion of *Garicinia Mangostana L.*

*Garcinia mangostana L.* ("mangosteen") is one fruit from the family Guttiferae. The mangosteen tree is very slow growing, erect, with a pyramidal crown. The mangosteen tree reaches a height of between 20 to 82 ft (6-25 m). The mangosteen tree has dark-brown or nearly black, flaking bark, the inner bark containing much yellow, gummy, bitter latex. The evergreen, opposite, short-stalked leaves are ovate-oblong or elliptic, leathery and thick, dark-green, slightly glossy above, yellowish-green and dull beneath; 3½ to 10 in (9-25 cm) long, 1¾ to 4 in (4.5-10 cm) wide, with conspicuous, pale midrib. New leaves are rosy. Flowers, 1½ to 2 in (4-5 cm) wide and fleshy, may be male or hermaphrodite on the same tree. The former are in clusters of 3-9 at the branch tips; there are 4 sepals and 4 ovate, thick, fleshy petals, green with red spots on the outside, yellowish-red inside, and many stamens though the aborted anthers bear no pollen. The hermaphrodite are borne singly or in pairs at the tips of young branchlets; their petals may be yellowish-green edged with red or mostly red, and are quickly shed.

The fruit, capped by the prominent calyx at the stem end and with 4 to 8 triangular, flat remnants of the stigma in a rosette at the apex, is round, dark-purple to red-purple and smooth externally; 1⅓ to 3 in (3.4-7.5 cm) in diameter. The rind is ¼ to ⅜ in (6-10 mm) thick, red in cross-section, purplish-white on the inside. It contains bitter yellow latex and a purple, staining juice. There are 4 to 8 triangular segments of snow-white, juicy, soft flesh (actually the arils of the seeds). The fruit may be seedless or have 1 to 5 fully developed seeds, ovoid-oblong, somewhat flattened, 1 in (2.5 cm) long and ⅝ in (1.6 cm) wide, that cling to the flesh. The flesh is slightly acid and mild to distinctly acid in flavor and is acclaimed to be delicious.

After harvest, in dry, warm, closed storage, mangosteens can be held 20 to 25 days. Longer periods cause the outer skin to toughen and the rind to become rubbery; later, the rind hardens and becomes difficult to open and the flesh turns dry.

Ripe mangosteens keep well for 3 to 4 weeks in storage at 40° to 55° F. (4.44°-12.78° C.). Trials in have shown that optimum conditions for cold storage are temperatures of 39° to 42° F. (3.89°-5.56° C.) and relative humidity of 85 to 90%, which maintain quality for 49 days. It is recommended that the fruits be wrapped in tissue paper and packed 25-to-the-box in light wooden crates with padding. Fruits picked slightly unripe have been shipped at 50° to 55° F. (10°-12.78° C.).

In a currently preferred process of producing *Garicinia mangostana L.* juice, the fruit is either hand picked or picked by mechanical equipment. The fruit is thoroughly cleaned after harvesting and before any processing occurs. The fruit is allowed to ripen or age from zero to 14 days, with most fruit being held from two to 3 days. The fruit is ripened or aged by being placed on equipment so it does not contact the ground. It is preferably covered with a cloth or netting material during aging, but can be aged without being covered. When ready for further processing the fruit is inspected for spoilage or for excessively green color and hard firmness. Spoiled and hard green fruit is separated from the acceptable fruit.

The ripened and aged fruit is preferably placed in plastic lined containers for further processing and transport. The containers of aged fruit can be held from zero to 30 days. Most fruit containers are held for 7 to 14 days before processing. The containers can optionally be stored under refrigerated conditions prior to further processing. The fruit is unpacked from the storage containers and is processed through a manual or mechanical separator. The seeds and peel are separated from the juice and pulp.

The juice and pulp can be packaged into containers for storage and transport. Alternatively, the juice and pulp can be immediately processed into finished juice product. The containers can be stored in refrigerated, frozen, or room temperature conditions. The *Garicinia mangostana L.* juice and puree are preferably blended in a homogenous blend, after which they may be mixed with other ingredients, such as flavorings, sweeteners, nutritional ingredients, botanicals, and colorings. The finished juice product is preferably heated and pasteurized at a minimum temperature of 181° F. (83° C.) or higher up to 212° F. (100° C.).

The product is filled and sealed into a final container of plastic, glass, or another suitable material that can withstand the processing temperatures. The containers are maintained at the filling temperature or may be cooled rapidly and then placed in a shipping container. The shipping containers are preferably wrapped with a material and in a manner to maintain or control the temperature of the product in the final containers.

The juice and pulp are further processed by separating the pulp from the juice through filtering equipment. The filtering equipment preferably consists of, but is not limited to, a centrifuge decanter, a screen filter with a size from 0.01 micron up to 2000 microns, more preferably less than 500 microns, a filter press, reverse osmosis filtration., and any other standard commercial filtration devices. The operating filter pressure preferably ranges from 0.1 psig up to about 1000 psig. The flow rate preferably ranges from 0.1 g.p.m. up to 1000 g.p.m., and more preferably between 5 and 50 g.p.m. The wet pulp is washed and filtered at least once and up to 10 times to remove any juice from the pulp. The wet pulp typically has a fiber content of 10 to 40 percent by weight. The wet pulp is preferably pasteurized at a temperature of 181° F. (83° C.) minimum and then packed in drums for further processing or made into a high fiber product.

The wet pulp may be further processed by drying. The methods of drying consist of but are not limited to freeze drying, drum drying, tray drying, sun drying, and spray drying. The dried *Garicinia mangostana L.* pulp preferably has a moisture content in the range from 5 to 90 percent by weight and more preferably from 5 to 10 percent by weight. The dried pulp preferably has a fiber content in the range from 0.1 to 30 percent by weight, and more preferably from 5 to 15 percent by weight.

The high fiber product typically includes, but is not limited to, wet or dry *Garicinia mangostana L.* pulp, supplemental fiber ingredients, water, sweeteners, flavoring agents, coloring agents, and nutritional ingredients. The supplemental fiber ingredients can include, but are not limited to plant based fiber products, either commercially available or developed privately. Examples of some typical fiber products are guar gum, gum arabic, soy bean fiber, oat fiber, pea fiber, fig fiber, citrus pulp sacs, hydroxymethylcellulose, cellulose, seaweed, food grade lumber or wood pulp, hemicellulose, etc. Other supplemental fiber ingredients may be derived from grains or grain products. The concentrations of these other fiber raw materials typically range from 0 up to 30 percent, by weight, and more preferably from 10 to 30 percent by weight.

Typical sweeteners typically include, but are not limited to, natural sugars derived from corn, sugar beet, sugar cane, potato, tapioca, or other starch-containing sources that can be chemically or enzymatically converted to crystalline chunks, powders, and/or syrups. In addition, sweeteners can consist of artificial or high intensity sweeteners, some of which are aspartame, sucralose, stevia, saccharin, etc. The concentration of sweeteners is preferably between from 0 to 50 percent by weight, of the formula, and more preferably between about 1 and 5 percent by weight.

Typical flavors can include, but are not limited to, artificial and/or natural flavor or is ingredients that contribute to palatability. The concentration of flavors is preferably from 0 up to 15 percent by weight, of the formula. Colors preferably include, but are not limited to, food grade artificial or natural coloring agents having a concentration ranging from 0 up to 10 percent by weight, of the formula.

Typical nutritional ingredients consist of but are not limited to vitamins, minerals, trace elements, herbs, botanical extracts, bioactive chemicals and compounds at concentrations from 0 up to 10 percent by weight. Examples of vitamins one can add to the fiber composition include, but are not limited to, vitamins A, B1 through B12, C, D, E, Folic Acid, Pantothenic Acid, Biotin, etc. Examples of minerals and trace elements one can add to the fiber composition include, but are not limited to, calcium, chromium, copper, cobalt, boron, magnesium, iron, selenium, manganese, molybdenum, potassium, iodine, zinc, phosphorus, etc. Herbs and botanical extracts include, but are not limited to, alfalfa grass, bee pollen, chlorella powder, Dong Quai powder, Ecchinacea root, Gingko Biloba extract, Horsetail herb, Indian mulberry, Shitake mushroom, spirulina seaweed, grape seed extract, etc. Typical bioactive chemicals can include, but are not limited to, caffeine, ephedrine, L-carnitine, creatine, lycopene, etc.

The juice and pulp can be dried using a variety of methods. The juice and pulp mixture can be pasteurized or enzymatically treated prior to drying. The enzymatic process begins with heating the product to a temperature between 75° F. and 135° F. It is then treated with either a single enzyme or a combination of enzymes. These enzymes include, but are not limited to, amylase, lipase, protease, cellulase, bromelin, etc. The juice and pulp can also be dried with other ingredients, such as those described above in connection with the high fiber product. The typical nutritional profile of the dried juice and pulp is 1 to 20 percent moisture, 0.1 to 15 percent protein, 0.1 to 80 percent fiber, and the vitamin and mineral content.

The filtered juice and the water from washing the wet pulp are preferably mixed together. The filtered juice is preferably vacuum evaporated to a brix of 40 to 70 and a moisture of 0.1 to 80 percent, more preferably from 25 to 75 percent. The resulting concentrated *Garicinia mangostana L.* juice may or may not be pasteurized. The juice would not be pasteurized in circumstances where the sugar content or water activity was sufficiently low enough to prevent microbial growth. It is packaged for storage, transport and/or further processing.

The Mangosteen plant is rich in natural ingredients. Those ingredients that have been discovered include xanthones. The rind of partially ripe fruits yields a polyhydroxy-xanthone derivative termed mangostin, also β-mangostin. That of fully ripe fruits contains the xanthones, gartanin, 8-disoxygartanin, and normangostin. A derivative of mangostin, mangostin-e, 6-di-O-glucoside, is a central nervous system depressant and causes a rise in blood pressure. The methanol extract of the fruit hulls of mangosteen exhibits potent radical scavenging effect. The antioxidative activity of xanthones present in mangosteen is more potent antioxidative activity than BHA and alpha-tocopherol.

The mangosteen fruit contains a compound called xanthones, which is thought to have antioxidant properties. The plant is also a rich source of other bioactive molecules including flavenoids, benzophenones, lactones, and phenolic acids. Recently, many health benefits have been discovered stemming from the use of products containing Mangosteen. Because of its many benefits, Mangosteen has been known to provide a number of anecdotal effects for antioxidant protection against free radicals, maintains immune system health, promotes joint flexibility, provides positive mental support, reduces allergies, reduces joint inflammation, and prevents cancer and others.

The human body produces free radicals during everyday life. Free radicals are atoms or groups of atoms with an odd number of (unpaired) electrons. Free radicals are very unstable and react quickly with other compounds. Once formed, free radicals can start a chain reaction of cell damage finally resulting in death of the cell. Antioxidants, such as vitamins A, C, and E, and selenium, are chemicals found in whole foods (especially fruits and vegetables) that help to protect the body's cells from the harmful effects of free radicals. Xanthone is a compound found in mangosteen fruit that may have antioxidant properties.

A variety of xanthones can be isolated from mangosteen plants and fruits including the hull, rind, heartwood, and flesh. In one study, six xanthones found in the mangosteen fruit were isolated from the fruit peel. These xanthones were then tested in vitro (in a test tube) on various tissue cell carcinomas. Of the six xanthones isolated, garcinone E was found to have potent cytotoxic (cancer fighting) effects on cancer cells of the liver, stomach, and lung.

In another study, a mangosteen derivative called gamma-mangostin was found to directly inhibit cyclooxygenase (COX) enzyme activity in rat glioma cells. The COX enzyme catalyzes the first step in the creation of prostaglandins from a common fatty acid. It adds two oxygen molecules to arachidonic acid to begin a set of reactions that ultimately creates a host of free radicals. Currently, no clinical trials have proven mangosteen fruit to have anticancer effects in humans and no published studies have proven xanthones to be beneficial to human cells.

The present invention contemplates utilizing various parts of the mangosteen plant. Raw materials and potential raw materials that the present invention contemplates using may be chosen from a list comprising: peel or rind extract (e.g., Xanthone), fruit juice fiber, peel or rind fiber, fruit juice concentrate, single strength juice, rind and fruit concentrate combination, and rind and fruit fiber combination.

II. General Discussion of Animal Food Products

Animal food products, and particularly companion or exotic animal foods, are generally classified into three types distinguished by their water content, namely (1) dry pet foods which generally have a water content of less than about 15% by weight, (2) soft and wet pet foods which generally have a water content of 20 to 45% by weight, and (3) pet foods which have a high water content of more than 45% by weight. The animal food products (3) having a high water content are generally sold in canned form. These canned foods require retorting because the high content of water is suitable for growth of microorganisms. Moreover, after can opening, the canned foods should be stored in a refrigerated state because they undergo spoilage very soon. Thus, the foods containing a high water content in canned form require high costs for processing and canning, and are inconvenient to store.

Foods (1) and (2) are easy to pack and transport, and do not need to be refrigerated after unpacking. They are easy to give to animals, and are convenient to animal keepers.

Animal food products, particularly those for domesticated animals, such as dogs, cats, etc., are primarily comprised of several common ingredients. These ingredients may be present in varying amounts depending upon the targeted animal for which the food is intended. In addition, several nutritional supplements and dietary additives may be included in an animal food product. The types and amounts of the ingredients and dietary supplements existing in a particular animal food product largely depends upon the animal for which the food is intended. For instance, depending upon an animal's age, weight, or species, the animal food product may comprise differing compositions or amounts by weight of ingredients and/or dietary supplements. Other factors might include whether an animal is sick, or is known to possess a genetic defect or disease, or whether an animal is allergic or prone to adverse reactions to certain kinds of ingredients. Still other animal food products are designed to increase the nutritional value of the food product. This may be accomplished by various means such as providing a food product that is high in protein, low in calories, or that provides a greater number of essential vitamins and minerals, etc.

a. Common Animal Food Product Ingredients

The ingredients or nutrients found in animal food products can be divided into several subcategories. These categories, which are discussed in greater detail below, include protein, carbohydrates, fats, vitamins and minerals, and water. Several different types of these ingredients are available and one ordinarily skilled in the art will be able to recognize that several different types may be present in a particular composition depending upon the targeted animal.

Protein. Common animal food protein sources include meat, fish, and some plant ingredients. Protein has many functions in the body, but is best known for supplying amino acids, or protein subunits, to build hair, skin, nails, muscles, tendons, ligaments, and cartilage. Protein also plays a main role in hormone production. Animals, particularly dogs and felines, require essential amino acids, such as taurine for cats, that are not all found in single plant protein sources.

In addition, for a protein source they may contain poultry meal, by-product meat, meat and bone meal, or other animal or fish meal by-products. At times as well, grain protein supplements such as corn gluten, soybean meal or other oil seed meals may be added.

Carbohydrates. Common carbohydrate sources are plants and grains. Carbohydrates, also categorized as starches (sugars) and fibers, provide energy and bulk, o respectively. Starches are made up of various types of sugar, such as glucose or fructose. Sugar can be easily converted by the dog or cat through digestion into usable energy.

Fiber may or may not be fermented—broken down into short-chain fatty acids—by bacteria in an animal's intestines. Highly fermentable fiber sources, such as vegetable gums, provide high amounts of short-chain fatty acids. Moderately fermentable fibers, such as beet pulp, provide short-chain fatty acids and bulk for moving waste. Slightly fermentable fibers, such as cellulose, provide mainly bulk for moving waste through the digestive tract and only a few short-chain fatty acids.

Selected fibers comprising the total dietary fiber content may comprise: *Garicinia mangostana* L. dietary fiber, apple pomace, barley, beet pulp, brewers rice, brown rice, carrageenan, carrots, cellulose, citrus pulp, corn, corn meal, corn grits, ground yellow corn, corn bran, dried whey, fructooligosaccharides, grain sorghum, gum arabic, gum talha, carob bean gum, guar gum, lactose, mannanoligosaccharides, molasses, oat groats, oatmeal, peanut hulls, pearled barley, peas, pea fiber, pectin, potato, psyllium, rice, rice bran, soybean hulls, sugar, tomato pomace, vegetable gum, wheat, wheat bran, and xanthan gum. However, one ordinarily skilled in the art will recognize that these are not meant to be all inclusive, but only illustrative of the types of fibers that may be included in the animal food product of the present invention.

In addition, there may typically be one or two cereal grains, generally corn, wheat and/or rice.

Fats. Fats are found in meats, fish, and plant oils, such as flax and vegetable oils. Fat, for all its bad press, fulfills many vital body functions. Animal cell membranes are made of fat. Fat is also responsible for helping maintain body temperature, controlling inflammation, and more. Fat is the primary form of stored energy in the body—providing. twice as much energy as carbohydrates or proteins. Fats also provide the important fat subunits, omega-6 and omega-3 fatty acids. Omega-6 fatty acids are essential for maintenance of skin and coat and proper membrane structure. Omega-3 fatty acids have been shown to be important in blood clotting and decreasing inflammation.

Vitamins & Minerals. Vitamins are responsible for aiding functions such as bone growth, blood clotting, energy production, and oxidant protection. Vitamins A, D, E, and K require fat for absorption into the body, while vitamins such as the B-complex vitamins and vitamin C, need water to be absorbed into the body. Minerals provide skeletal support and aid in nerve transmission and muscle contractions.

Water. Water is the single most important nutrient for the body. Without it, the body cannot transport nutrients, digest nutrients for energy, regulate temperature, or eliminate waste.

As will be recognized by one ordinarily skilled in the art, specific compositions or amounts present by weight of each of these ingredients varies from product to product. However, for the most part, the percentages by weight are: Protein from 14% to 50%, usually 20% to 25%; fat from 5% to 25%; carbohydrates, where fiber is typically present in the range of from about 3% to 14%, usually about 5% to 7%; vitamins and minerals from 1% to 10%; and water or other moisture ingredients making up the remainder.

b. Recent Developments in Animal Food Products

Largely in part to research and technological advancements, animal food products have become more advanced in their ability to specifically target and cater to specific needs of different animals. The following are only intended as examples of some of the various types of animal food products and their particular problem solving capabilities that are in existence today.

EXAMPLE ONE

In one composition, ingredients are designed and included to improve several important clinical indicators in an animal suffering from renal disease. These needs are met by providing a pet food composition, which improves several important clinical indicators in the renal patient and includes adequate protein, has low phosphorus levels, improves metabolic buffering, and lowers blood triglyceride levels in the animal. The animal is fed a composition comprising 17 to about 22 percent crude protein, about 13 to about 15 percent fat, about 7 to about 12 percent total dietary fiber, and fermentable fibers which have an organic matter disappearance of 15 to 60 percent when fermented by fecal bacteria for a 24 hour period, the fibers being present in amounts from about 1 to 11 weight percent of supplemental total dietary fiber. The animal is maintained on the diet for a sufficient period of time to reduce BUN and creatinine levels in the animal.

The fermentable fibers are selected from the group consisting of beet pulp, gum arabic, gum talha, psyllium, rice bran, carob bean gum, citrus pulp, pectin, fructooligosaccharides, mannanoligosaccharides and mixtures thereof. Most preferably, the fermentable fibers are beet pulp or a blend of beet pulp, gum talha or gum arabic, and fructooligosaccharides.

Optionally, the composition may also have a phosphorus content of less than about 0.50%, and preferably less than about 0.25%, by weight to prevent hyperphosphatemia. The composition may also optionally contain potassium citrate as a metabolic buffering agent. Inclusion of potassium citrate has been found to ameliorate metabolic acidosis in animals with renal disease.

EXAMPLE TWO

Pets, similar to humans, exhibit significant genetic diversity, which affects their overall health and nutritional requirements. Ingredient tolerance and nutrient metabolism differ among breeds. Breed-specific dog food formulations that comprise chicken meat as the major ingredient, rice as the predominant (or sole) grain source, fruit and/or vegetable fiber as the primary or sole fiber source, unique fat and antioxidant blend, vitamins, herbs and spices, carotenoids, and no corn or artificial colors, preservatives, flavors or sugars may be provided to cater to these specific needs.

The formulations designed for specific breeds are designed based on the genetic diversity of different dog breeds. More specifically, dog food formulations are designed taking into account the different food allergies of different dog breeds.

Breed-specific dog food formulations may comprise the following unique combination of ingredients and features: (i) chicken meat and/or meal as the primary ingredient (and only meat source); (ii) rice as the primary grain source; (iii) unique antioxidant blend; (iv) unique fat blend; (v) organic minerals; (vi) unique fiber blend; (vii) specific combinations of herbs and species; (viii) no added artificial colors or preservatives, flavors or sugars; and (ix) nutrition substantiation through AAFCO feeding studies.

These pet food formulations, having the above ingredients and features, provide: (1) total digestibility ranges from 85-90%; (2) no meat products other than chicken meat and/or meal; (3) absence of any corn; (4) a blend of vitamins including tocopherols, vitamin C (ascorbic acid), minerals (copper, zinc and iron in inorganic and organic complex form), carotenoids (e.g., beta carotene and lutein), and herbs (including rosemary); (5) a fat blend including canola oil, salmon oil and evening primrose oil; (6) fruit and/or vegetable fiber rather than grains, such as tomato pomace, as the primary fiber source; (7) herbs and spices including spearmint, ginger, ginseng, ginkgo, parsley and *Yucca schidigera* extract; and (8) kibble size, shape, feed recommendations tailored to specific breed.

EXAMPLE THREE

Disease prevention is important both in humans as well as companion animals. A healthy immune system plays an important role both in preventing and fighting disease. Enhancing immune response and improving the overall health of companion animals, such as felines and dogs, is achievable through a pet food supplement and process, which includes beneficial amounts of .beta.-carotene in the animal's diet. Some studies have reported only low to undetectable amounts of .beta.-carotene in the circulating blood and organs of dogs. Further, because of the known inability of cats to convert .beta.-carotene to vitamin A, their diets have not included .beta.-carotene supplements.

The animal is fed a diet, which includes from about 1 to about 50 mg/day of .beta.-carotene (from about 6 to about 315 mg .beta.-carotene/kg diet). Such a diet provides sufficient .beta.-carotene to be absorbed by the animal and supplied to the blood and blood leukocytes and neutrophils in the animal.

EXAMPLE FOUR

Obesity is the most common nutritional disease of companion pets in an affluent society. It in fact exceeds by far all deficiency diseases combined. Obesity generally is considered present when body weight of the companion pet is 15% or more greater than optimum, which is the point at which health problems begin increasing with increasing weight. It has, for example, been reported that in affluent societies from 24% to 44% of the dogs are obese. Generally speaking, the incidence of obesity in companion pets increases with the age of the pet. Similar to humans, as the animals age body fat increases, and the amount of lean body mass decreases.

A dog food composition may be provided, which contains a small, but effective amount of simmondsin component to provide a simmondsin activity within the range of about 0.1 to about 1.5 percent by weight of the composition. Weight reduction and obesity prevention is accomplished by adding pet food that contains the above-defined range of simmondsin activity, contributed by simmondsin analogues or mixtures thereof such as that synthesized or derived from jojoba seeds or defatted jojoba seed meal, to a companion pets diet on a regular and sustained basis until sufficient weight reduction occurs, and obesity occurrence or recurrence is prevented.

EXAMPLE FIVE

Large or giant breed puppies grow to a larger body size than smaller breed puppies, and as a result, they have a genetic propensity to grow very rapidly when provided with a nutrient-rich diet. However, it has been found that such rapid growth can result in an imbalance between the rate of body weight gain and skeletal growth of the puppies. In addition, the bones of large and giant breed dogs are less dense than bones of smaller breed dogs. Accordingly, large or giant breed puppies are often susceptible to skeletal growth abnormalities including disturbances in endochondral ossification, which may lead to osteochondrosis, hypertrophic osteodystrophy, and hip dysplasia.

Pet food compositions may comprise from about 0.75 to 0.95 percent by weight calcium and from about 0.62 to 0.72 percent by weight phosphorus on a total weight basis. Preferably, the ratio of calcium to phosphorus is greater than about 1:1 and is preferably about 1.2:1 to 1.3:1. The composition further comprises a source of protein, a source of fiber, and a source of fat.

When the pet food composition of the present invention is fed to large or giant breed puppies on a daily basis, it has been found to be effective in reducing the incidence of skeletal disease while providing adequate growth rates.

EXAMPLE SIX

Diarrhea is defined as an increase in fecal water content with an accompanying increase in the frequency, fluidity or volume of bowel movements. In addition, diarrhea is the primary clinical sign of intestinal disease in the dog and one of the most common presenting signs in veterinary medicine. Several approaches may be taken to improve the gastrointestinal diets of companion animals to address the problem.

Some compositions use reduced fiber and fat as methods to help alleviate the diarrhea. Others use high quantities of cellulose fiber to overwhelm the gastrointestinal tract with an insoluble fiber. The end product of this approach is an increase in fecal bulk.

Another method is to provide a composition that uses moderate levels of dietary fermentable fibers to provide the intestinal tract with an ample supply of preferred oxidative fuel sources. This approach seeks to relieve symptoms of chronic diarrhea by "feeding" the cells, which line the gastrointestinal tract of the animal. Epithelial cells, such as enterocytes and colonocytes, depend upon respiratory fuels to maintain cellular turnover and function. These respiratory fuels can either be derived from the bowel lumen or from systemic circulation. Colonocytes derive more than 70% of their energy from lumenal nutrition supplied by short-chain fatty acids (SCFAs).

These examples and their ingredients, while illustrative of known prior art advances in animal food products, may be significantly enhanced through the inclusion of *Garicinia mangostana L.* as an ingredient. By doing so, these products may provide yet further advantages and benefits to the animals for which they are intended. As there exists many different types of animal food products, each containing significantly different compositions of ingredients, the present invention seeks to provide an animal food product that is capable of enhancing any specific composition or formulation by the addition of *Garicinia mangostana L.* As such, several Examples have been provided, which are discussed below, wherein *Garicinia mangostana L.* has been added to a specific composition of ingredients to create an enhanced and beneficial animal food product.

III. *Garicinia Mangostana* L. Enhanced Animal Food Product

The present invention provides significant advantages over prior art animal food products due to the inclusion of *Garicinia mangostana L.* ("mangosteen") within the animal food product composition. These advantages are based on the known biological activities of xanthones and polysaccharides in particular and fruit juices in general. Some of the advantages imparted by the use of Mangosteen include: antioxidant, anti-AIDS, anti-cancer, anti inflammatory, analgesic properties, stool softener (fiber), flavoring, COX-2 inhibitor, anticancer, antimycobaterial, antihepatocellular, antihistamine (for respiratory problems), 5HT2A Receptor antagonist (this might be helpful in calming animals particularly horses with anxiety), antimicrobial (systemic and topically), and antifungal.

The present invention features an animal food product containing an amount or percent by weight of *Garicinia mangostana L.* dietary fiber as part of the total dietary fiber content in an animal food product. The *Garicinia mangostana L.* is added or mixed into the animal food product composition, along with the other ingredients comprised therein. As stated above, pet foods are normally classified as wet, semi-wet (or soft), and dry. These classifications largely depend upon the amount of moisture or water that is added to the pet food formulation or composition.

The present invention features an animal food product containing mangosteen and may also include (percentage by weight) one or more ingredients chosen from a list of ingredients comprised of: 0-80% protein, 0-80% carbohydrates, 0-80% fat, vitamins A to Z, minerals, electrolytes, amino acids, fatty acids, herbs, botanicals, nutraceuticals, and adaptogens.

The following examples are given to illustrate various embodiments, which have been made or may be made in accordance with the present invention and are given by way of example only. It is to be understood that the following examples are not all inclusive, comprehensive, or exhaustive of the many types of embodiments of the present invention, which can be prepared in accordance with the technology as described herein.

EXAMPLE ONE

The following animal food formulation is concentrated on providing improved muscle and bone support.

| Ingredients | Percent by Weight |
| --- | --- |
| Glucosamine HCl | 5–10% |
| Cetyl Myristoleate | 1–5% |
| MSM | <1% |
| Chondroitin Sulfate | 1–5% |
| Perna Mussel Extract | 1–5% |
| water | 40–60% |
| *Garicinia mangostana* L. (Mangosteen) concentrate | 10–30% |
| flavor | <1% |

EXAMPLE TWO

The following animal food formulation is concentrated on providing improved skin and hair support.

| Ingredients | Percent by Weight |
| --- | --- |
| Omega-3 Fish Oil | 10–20% |
| OPC's Complex | <1% |
| Quercetin | 1–5% |
| Golden Seal Extract | 1–5% |
| Garlic Oil Extract | 5–10% |
| water | 40–60% |
| lecithin | 1–5% |
| flavor | <1% |
| *Garicinia mangostana* L. (Mangosteen) extract | 10–30% |

EXAMPLE THREE

The following animal food formulation is concentrated on providing improved immune system support.

| Ingredients | Percent by Weight |
| --- | --- |
| 1,3 beta D-Glucan | <1% |
| Astragalus Extract | 5–10% |
| Echinacea Extract | 1–5% |
| Japanese Mushrooms (Maitake, Shiitake, Reishi) Extract | 1–5% |
| Shark Liver Oil (squalamine) | 5–10% |
| water | 40–60% |
| flavor | <1% |
| lecithin | 1–5% |
| Garicinia mangostana L. (Mangosteen) extract | 10–30% |

EXAMPLE FOUR

The following animal food formulation is concentrated on providing improved digestive system support.

| Ingredients | Percent by Weight |
| --- | --- |
| Glutamine | 5–10% |
| Milk Thistle Extract | 5–10% |
| Ginger Extract | 1–5% |
| Licorice Extract, DGL | 1–5% |
| Tumeric Extract | 5–10% |
| flavor | <1% |
| water | 40–60% |
| Garicinia mangostana L. (Mangosteen) extract | 10–30% |

EXAMPLE FIVE

The following animal food formulation is concentrated on providing improved anti-aging support.

| Ingredients | Percent by Weight |
| --- | --- |
| OPC's Complex | 5–10% |
| Ginko Biloba Extract | 1–5% |
| Co-enzyme Q10 | 1–5% |
| Arginine | 10–20% |
| Dimethylglycine | 1–5% |
| flavor | <1% |
| water | 40–60% |
| Garicinia mangostana L. (Mangosteen) extract | 10–30% |

EXAMPLE SIX

The following animal food formulation is concentrated on providing improved overall health and well-being.

| Ingredients | Percent by Weight |
| --- | --- |
| OPC's Complex | 1–5% |
| Grass Extract (Barley, Wheat) | 5–10% |
| L-Carnitine | 10–20% |
| flavor | <1% |
| water | 40–60% |
| Garicinia mangostana L. (Mangosteen) extract | 10–30% |

As stated, these examples are not intended to be limiting in any way. One ordinarily skilled in the art will recognize the many different compositions of ingredients that may be incorporated into an animal food product. Moreover, one ordinarily skilled in the art should recognize that other ingredients may be added, that are not listed here, and included with the Garicinia mangostana L. dietary fiber to complete the pet food formulation or composition. This especially becomes evident when one considers the many different types of pet food formulations existing in the market today, including those that are capable of targeting a specific need of a companion animal or a particular companion animal altogether. As such, the concentration or percent by weight of the Garicinia mangostana L. dietary fiber, as well as any of the other ingredients, may be increased or decreased as needed.

In an alternative embodiment, the Garicinia mangostana L. dietary fiber may be contained in various other animal food products, such as pet food snack, biscuits, etc.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. An animal food product comprising:
    Garicinia mangostana L. dietary fiber present in an amount between about 1 and 12 percent by weight; and
    Garicinia mangostana L. fruit juice present in an amount between about 10 and 30 percent by weight.

2. The animal food product of claim 1, wherein said Garicinia mangostana L. is present in an amount between about 0.1 and 5 percent by weight.

3. The animal food product of claim 1, wherein said Garicinia mangostana L. is present in an amount between about 5 and 10 percent by weight.

4. The animal food product of claim 1, wherein said Garicinia mangostana L. is present in an amount between about 10 and 15 percent by weight.

5. The animal food product of claim 1, wherein said Garicinia mangostana L. is present in an amount between about 15 and 20 percent by weight.

6. The animal food product of claim 1, wherein said Garicinia mangostana L. is present in an amount between about 20 and 25 percent by weight.

7. The animal food product of claim 1, wherein said Garicinia mangostana L. is present in an amount between about 25 and 30 percent by weight.

8. The animal food product of claim 1, wherein said Garicinia mangostana L. is present in an amount between about 30 and 35 percent by weight.

9. The animal food product of claim 1, wherein said Garicinia mangostana L. is present in an amount between about 35 and 40 percent by weight.

10. The animal food product of claim 1, wherein said Garicinia mangostana L. is present in an amount between about 40 and 45 percent by weight.

11. The animal food product of claim 1, wherein said Garicinia mangostana L. is present in an amount between about 45 and 50 percent by weight.

12. The animal food product of claim 1, wherein said Garicinia mangostana L. is present in an amount between about 50-55 percent by weight.

13. The animal food product of claim 1, wherein said Garicinia mangostana L. is present in an amount between about 55-60 percent by weight.

14. The animal food product of claim 1, wherein said *Garicinia mangostana* L. is present in an amount between about 60-65 percent by weight.

15. The animal food product of claim 1, wherein said *Garicinia mangostana* L. is present in an amount between about 65-70 percent by weight.

16. The animal food product of claim 1, wherein said *Garicinia mangostana* L. is present in an amount between about 70-75 percent by weight.

17. The animal food product of claim 1, wherein said *Garicinia mangostana* L. is present in an amount between about 75-80 percent by weight.

18. The animal food product of claim 1, wherein said *Garicinia mangostana* L. is enzymatically treated.

19. The animal food product of claim 1, further comprising water present in an amount between about 20-80 percent by weight.

20. The animal food product of claim 1, further comprising glucosamine HCI present in an amount between about 5-10 percent by weight.

21. The animal food product of claim 1, further comprising cetyl-myristoleate present in an amount between about 1-5 percent by weight.

22. The animal food product of claim 1, further comprising MSM present in an amount between about 0.01-1 percent by weight.

23. The animal food product of claim 1, further comprising chondroitin sulfate present in an amount between about 1-5 percent by weight.

24. The animal food product of claim 1, further comprising Perna Mussel Extract present in an amount between about 1-5 percent by weight.

25. The animal food product of claim 1, further comprising flavor present in an amount between about 0.01-1 percent by weight.

26. The animal food product of claim 1, further comprising omega-3 Fish Oil present in an amount between about 10-20 percent by weight.

27. The animal food product of claim 1, further comprising oligomeric proanthocyanidins present in an amount between about 0.01-1 percent by weight.

28. The animal food product of claim 1, further comprising Quercetin present in an amount between about 1-5 percent by weight.

29. The animal food product of claim 1, further comprising Golden Seal Extract present in an amount between about 1-5 percent by weight.

30. The animal food product of claim 1, further comprising Garlic Oil Extract present in an amount between about 0.1-10 percent by weight.

31. The animal food product of claim 1, further comprising lecithin present in an amount between about 0.01-5 percent by weight.

32. The animal food product of claim 1, further comprising flavor present in an amount between about 0.01-1 percent by weight.

33. The animal food product of claim 1, further comprising 1,3 Beta D-Glucan present in an amount between about 0.01-1 percent by weight.

34. The animal food product of claim 1, further comprising Astragalus Extract present in an amount between about 0.1-10 percent by weight.

35. The animal food product of claim 1, further comprising Echinacea Extract present in an amount between about 1-5 percent by weight.

36. The animal food product of claim 1, further comprising Japanese Mushrooms Extract present in an amount between about 1-5 percent by weight.

37. The animal food product of claim 1, further comprising Shark Liver Oil present in an amount between about 5-10 percent by weight.

38. The animal food product of claim 1, further comprising glutamine present in an amount between about 5-10 percent by weight.

39. The animal food product of claim 1, further comprising Milk Thistle Extract present in an amount between about 5-10 percent by weight.

40. The animal food product of claim 1, further comprising Ginger Extract present in an amount between about 1-5 percent by weight.

41. The animal food product of claim 1, further comprising Licorice Extract present in an amount between about 1-5 percent by weight.

42. The animal food product of claim 1, further comprising Tumeric Extract present in an amount between about 5-10 percent by weight.

43. The animal food product of claim 1, further comprising OPC's complex present in an amount between about 5-10 percent by weight.

44. The animal food product of claim 1, further comprising Ginko Bilboa Extract present in an amount between about 1-5 percent by weight.

45. The animal food product of claim 1, further comprising Co-enzyme Q10 present in an amount between about 1-5 percent by weight.

46. The animal food product of claim 1, further comprising Arginine present in an amount between about 10-20 percent by weight.

47. The animal food product of claim 1, further comprising Dimethylglycine present in an amount between about 1-5 percent by weight.

48. The animal food product of claim 1, further comprising OPC's Complex present in an amount between about 1-5 percent by weight.

49. The animal food product of claim 1, further comprising Grass Extract present in an amount between about 5-10 percent by weight.

50. The animal food product of claim 1, further comprising L-Carnitine present in an amount between about 10-20 percent by weight.

51. The animal food product of claim 1, further comprising suitable amounts of protein, fats, vitamins, minerals, and carbohydrates.

* * * * *